(12) United States Patent
Fan et al.

(10) Patent No.: US 11,429,882 B2
(45) Date of Patent: Aug. 30, 2022

(54) METHOD AND APPARATUS FOR OUTPUTTING INFORMATION

(71) Applicant: Baidu Online Network Technology (Beijing) Co., Ltd., Beijing (CN)

(72) Inventors: Bingbing Fan, Beijing (CN); Hao Liang, Beijing (CN)

(73) Assignees: BAIDU ONLINE NETWORK TECHNOLOGY (BEIJING) CO., LTD., Beijing (CN); SHANGHAI XIAODU TECHNOLOGY CO. LTD., Shanghai (CN)

( * ) Notice: Subject to any disclaimer, the term of this patent is extended or adjusted under 35 U.S.C. 154(b) by 503 days.

(21) Appl. No.: 16/664,614

(22) Filed: Oct. 25, 2019

(65) Prior Publication Data
US 2020/0302312 A1   Sep. 24, 2020

(30) Foreign Application Priority Data
Mar. 20, 2019   (CN) .......................... 201910214778.5

(51) Int. Cl.
*G06N 5/04* (2006.01)
(52) U.S. Cl.
CPC ..................... *G06N 5/04* (2013.01)

(58) Field of Classification Search
None
See application file for complete search history.

(56) References Cited

FOREIGN PATENT DOCUMENTS

| CN | 101078629 A | 11/2007 |
|---|---|---|
| CN | 101626464 A | 1/2010 |
| CN | 101646038 A | 2/2010 |
| CN | 105279866 A | 1/2016 |
| CN | 105282585 A | 1/2016 |
| CN | 105323392 A | 2/2016 |
| CN | 107122160 A | 9/2017 |
| CN | 107219988 A | 9/2017 |
| CN | 107491300 A | 12/2017 |
| CN | 108093146 A | 5/2018 |
| CN | 108347646 A | 7/2018 |
| CN | 108520748 A | 9/2018 |
| JP | 2006-250674 A | 9/2006 |
| KR | 10-2010-0091602 A | 8/2010 |
| WO | 2018/200329 A1 | 11/2018 |

*Primary Examiner* — Brian Whipple
(74) *Attorney, Agent, or Firm* — Kilpatrick Townsend & Stockton LLP (57) ABSTRACT

Embodiments of the present disclosure relate to a method and apparatus for outputting information. The method can include: searching, in response to that user's behavior is preset repetitive behavior being detected, first guidance information matching the user's behavior in a preset guidance information set, where guidance information is used to guide a user to use speech instead of the preset repetitive behavior; and outputting the first guidance information.

20 Claims, 4 Drawing Sheets

METHOD AND APPARATUS FOR OUTPUTTING INFORMATION

CROSS-REFERENCE TO RELATED APPLICATIONS

This application claims priority to Chinese Patent Application No. 201910214778.5, filed with the China National Intellectual Property Administration (CNIPA) on Mar. 20, 2019, the contents of which are incorporated herein by reference in its entirety.

TECHNICAL FIELD

Embodiments of the present disclosure relate to the field of computer technology, and specifically to a method and apparatus for outputting information.

BACKGROUND

With the rapid development of artificial intelligence, trending applications and products about artificial intelligence have received more and more attention. For example, users can directly interact with intelligent hardware or software in the forms of text, speech, pictures, etc. Taking TVs or large-screen devices connected to TV boxes as an example, users still rely more on remote controllers for operation. In order to guide a user to interact with an intelligent device by using a speech instruction, the user is usually guided to use speech interaction at a preset time (for example, first boosting) or when the user clicks a "Use Help" button

SUMMARY

Embodiments of the present disclosure provide a method and apparatus for outputting information.

In a first aspect, an embodiment of the present disclosure provides a method for outputting information, the method including: searching, in response to that a user's behavior is preset repetitive behavior being detected, first guidance information matching the user's behavior in a preset guidance information set, where guidance information is used to guide a user to use speech instead of the preset repetitive behavior; and outputting the first guidance information.

In some embodiments, the method further includes: acquiring object information of a behavior object being directed at by the user's behavior.

In some embodiments, the searching, in response to that user's behavior is preset repetitive behavior being detected, first guidance information matching the user's behavior in a preset guidance information set includes: determining, in response to that the user's behavior is the preset repetitive behavior being detected, a user's operation intention based on the user's behavior; and searching, based on operation intention corresponding to each piece of guidance information in the preset guidance information set, the first guidance information matching the user's operation intention.

In some embodiments, the determining, in response to that the user's behavior is a preset repetitive behavior being detected, a user's operation intention based on the user's behavior includes: determining, in response to that the user's behavior is preset repetitive behavior being detected, a user's operation intention based on the user's behavior and the object information of the behavior object being directed at by the user's behavior.

In some embodiments, the method further includes: in response to that the object information of the behavior object being directed at by the user's behavior satisfies a preset guidance trigger condition being detected, searching second guidance information matching the object information in the preset guidance information set.

In some embodiments, the searching, in response to that a user's behavior is a preset repetitive behavior being detected, first guidance information matching the user's behavior in a preset guidance information set includes: in response to that the user's behavior is the preset repetitive behavior being detected, detecting a preset behavior indicating that a repetitive behavior corresponding to the user's behavior has been terminated; and in response to the detected preset behavior, searching in the preset guidance information set first guidance information matching the user's behavior and being used to guide the user to use speech next time instead of the repetitive behavior.

In some embodiments, the searching, in response to that a user's behavior is a preset repetitive behavior being detected, first guidance information matching the user's behavior in a preset guidance information set further includes: in response to that the user's behavior is the preset repetitive behavior being detected and the preset behavior being not detected, searching in the preset guidance information set first guidance information matching the user's behavior and being used to guide the user to use speech currently instead of the repetitive behavior.

In some embodiments, the outputting the first guidance information includes: determining, based on the first guidance information, a category of the first guidance information, where the category includes a guidance category and a task category; in response to determining that the first guidance information belongs to the guidance category, determining a presentation mode of the first guidance information displayed in the form of a bubble, where the presentation mode includes at least one of: appearing with a focus, or appearing from a preset position; in response to determining that the first guidance information belongs to the task category, determining a task subcategory of the first guidance information, where the task subcategory includes a novice task category and a speech task category; determining, according to the determined task subcategory, a presentation time of the first guidance information displayed in the form of a bubble; determining a position of the first guidance information displayed in the form of a bubble in a display interface; and presenting the first guidance information according to the determined position, in presentation mode or presentation time.

In a second aspect, an embodiment of the present disclosure provides an apparatus for outputting information, the apparatus including: a first search unit, configured to search, in response to that user's behavior is preset repetitive behavior being detected, first guidance information matching the user's behavior in a preset guidance information set, where guidance information is used to guide a user to use speech instead of the preset repetitive behavior; and an output unit, configured to output the first guidance information.

In some embodiments, the apparatus further includes: an acquisition unit, configured to acquire object information of a behavior object being directed at by the user's behavior.

In some embodiments, the first search unit includes: a first determination module, configured to determine, in response to that the user's behavior is the preset repetitive behavior being detected, a user's operation intention based on the user's behavior; and a first search module, configured to search, based on operation intention corresponding to each piece of guidance information in the preset guidance information set, the first guidance information matching the user's operation intention.

In some embodiments, the first search module is further configured to determine, in response to that the user's behavior is the preset repetitive behavior being detected, the user's operation intention based on the user's behavior and the object information of the behavior object being directed at by the user's behavior.

In some embodiments, the apparatus further includes: a second search unit, configured to search, in response to that the object information of the behavior object being directed at by the user's behavior satisfies a preset guidance trigger condition being detected, second guidance information matching the object information in the preset guidance information set.

In some embodiments, the first search unit includes: a detection module, configured to detect, in response to that the user's behavior is the preset repetitive behavior being detected, preset behavior indicating that the repetitive behavior corresponding to the user's behavior has been terminated; and a second search module, configured to search in the preset guidance information set, in response to the detected preset behavior, first guidance information matching the user's behavior and being used to guide the user to use speech next time instead of the repetitive behavior.

In some embodiments, the first search unit further includes: a third search module configured to search in the preset guidance information set, in response to that the user's behavior is the preset repetitive behavior being detected and the preset behavior being not detected, first guidance information matching the user's behavior and being used to guide the user to use speech currently instead of the repetitive behavior.

In some embodiments, the output unit includes: a category determination module, configured to determine, based on the first guidance information, a category of the first guidance information, where the category includes a guidance category and a task category; a presentation mode determination module, configured to determine, in response to determining that the first guidance information belongs to the guidance category, a presentation mode of the first guidance information displayed in the form of a bubble, where the presentation mode includes at least one of: appearing with a focus, or appearing from a preset position; a subcategory determination module, configured to determine, in response to determining that the first guidance information belongs to the task category, a task subcategory of the first guidance information, where the task subcategory includes a novice task category and a speech task category; and to determine, according to the determined task subcategory, a presentation time of the first guidance information displayed in the form of a bubble; a position determination module, configured to determine a position of the first guidance information displayed in the form of a bubble in a display interface; and a presentation module, configured to present the first guidance information according to the determined position, presentation mode or presentation time.

In a third aspect, an embodiment of the present disclosure provides a terminal, the terminal including: one or more processors; and a storage apparatus storing one or more programs; and a display, configured to display information; where when the one or more programs are executed by the one or more processors, the one or more processors implement the method as described by any implementation in the first aspect.

In a fourth aspect, an embodiment of the present disclosure provides a computer readable medium storing a computer program, and when the computer program is executed by a processor, the method as described in any implementation in the first aspect is implemented.

According to the method and apparatus for outputting information provided by some embodiments of the present disclosure, in response to that a user's behavior is a preset repetitive behavior being detected, first guidance information matching the user's behavior is searched in a preset guidance information set, where guidance information is used to guide a user to use speech instead of the preset repetitive behavior; and then the first guidance information is output. Timely guidance to guide the user to use speech is achieved based on the repetitive interaction behavior between the user and an executing body, so that the user's repetitive behavior is replaced by speech interaction.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

Embodiments of present disclosure will be further described below in detail in combination with the accompanying drawings. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that some embodiments in the present disclosure and some features in the disclosure may be combined with each other on a non-conflict basis. Features of present disclosure will be described below in detail with reference to the accompanying drawings and in combination with embodiments.

Figure 1:
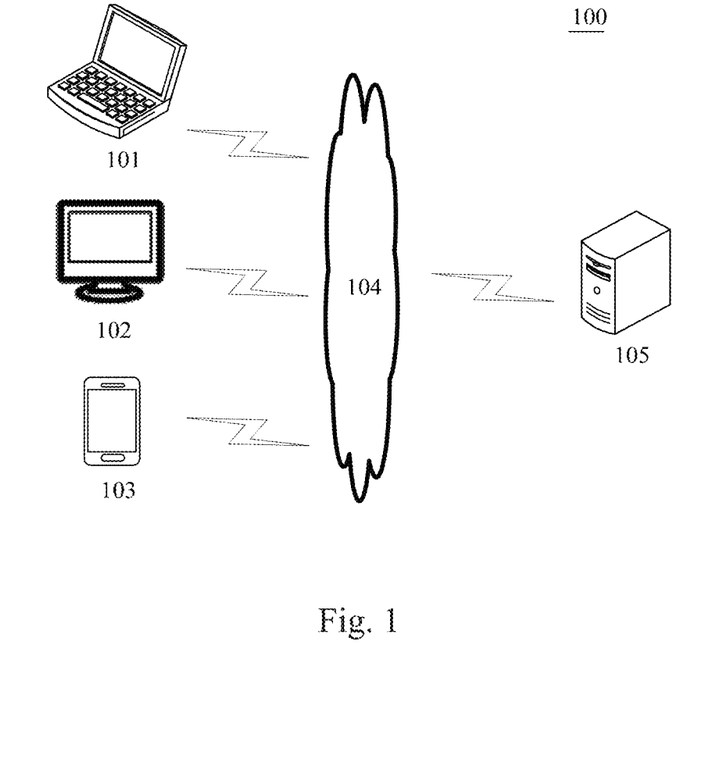
FIG. 1 is an architectural diagram of an example system to which an embodiment of the present disclosure may be applied.

FIG. 1 shows an example architecture 100 to which a method for outputting information or an apparatus for outputting information may be applied.

As shown in FIG. 1, the system architecture 100 may include a terminal device 101, 102 or 103, a network 104, and a server 105. The network 104 serves as a medium providing a communication link between the terminal device 101, 102 or 103 and the server 105. The network 104 may include various types of connections, such as wired or wireless communication links, or optical fiber cables.

The terminal device 101, 102 or 103 may interact with the server 105 through the network 104 to receive or send messages, etc. The terminal device 101, 102 or 103 may be installed with various communication client applications, such as web browser applications, shopping applications, search applications, instant messaging tools, e-mail clients, social platform software, and audio and video playback applications.

The terminal device 101, 102 or 103 may be hardware or software. When being hardware, the terminal device 101, 102 or 103 may be various electronic devices having a display screen and supporting audio and video playback, including but not limited to a smart phone, a tablet computer, an MP4 (Moving Picture Experts Group Audio Layer IV) player, a laptop portable computer, a desktop computer, etc. When being software, the terminal device 101, 102 or 103 may be installed in the above-listed electronic devices. The terminal device 101, 102 or 103 may be implemented as a plurality of software programs or software modules (e.g., for providing distributed services), or as a single software program or software module, which is not specifically limited in the present disclosure.

The server 105 may be a server providing various services, for example, a back-end server providing file resources for audio and video playback applications in the terminal 101, 102 or 103. The back-end server may process an audio and video playback request sent by a terminal, and feed the requested file resource back to the terminal device.

It should be noted that the audio and video file resources may also be directly stored locally in the terminal device 101, 102 or 103, the terminal device 101, 102 or 103 may directly extract the audio and video file resources stored locally for playing, and the network 104 and the server 105 may not be provided accordingly.

It should be noted that the server may be hardware or software. When being hardware, the server may be implemented as a distributed server cluster composed of multiple servers, or implemented as a single server. When being software, the server may be implemented as a plurality of software programs or software modules (e.g., for providing distributed services), or as a single software program or software module, which is not specifically limited in the present disclosure.

It should be noted that the method for outputting information according to the embodiments of the present disclosure is generally executed by the terminal device 101, 102 or 103, and accordingly, the apparatus for outputting information is generally provided in the terminal device 101, 102 or 103.

It should be understood that the numbers of the terminal devices, the network and the server in FIG. 1 are merely illustrative. Any number of terminal devices, networks and servers may be provided based on actual requirements.

Figure 2:
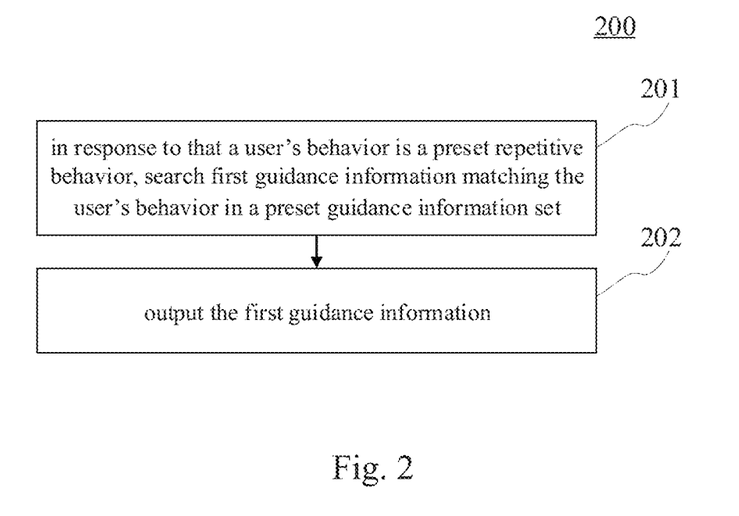
FIG. 2 is a flowchart of a method for outputting information according to an embodiment of the present disclosure.

Further, referring to FIG. 2, a flow 200 of a method for outputting information according to an embodiment of the present disclosure is shown. The method for outputting information includes the following steps.

Step 201: searching, in response to that a user's behavior is a preset repetitive behavior being detected, first guidance information matching the user's behavior in a preset guidance information set.

In the present embodiment, in response to that the user's behavior is preset repetitive behavior being detected, an executing body (e.g., the terminal device 101, 102 or 103 shown in FIG. 1) of the method for outputting information may search the first guidance information matching the user's behavior in the preset guidance information set. The user's behavior may be used to characterize an operation behavior of the user interacting with the executing body. As an example, the user's behavior may characterize volume turn-up or turn-down, or characterize a page turning operation, a search operation, etc. The preset repetitive behavior may be used to characterize an operation behavior of repeating an identical operation. As an example, the preset repetitive behavior may characterize that a control key for volume turn-up is consecutively pressed three times, or a control key for fast forward is being pressed for more than 3 seconds, or the same television drama is played at about (e.g., 20 minutes before and after) 7 o'clock every night for 5 consecutive days.

In the present embodiment, the executing body may detect the user's behavior in various ways. As an example, the executing body may detect whether the user presses an operation key installed on the executing body. As another example, the executing body may also detect whether an electronic device (e.g., a remote controller) in communication connection therewith transmits information corresponding to the operation behavior, such as information characterizing a page turning operation or a volume change.

In the present embodiment, in response to that the user's behavior is preset repetitive behavior being detected, the executing body may search the guidance information matching the user's behavior in the preset guidance information set as first guidance information. The guidance information may be used to guide the user to use speech instead of preset repetitive behavior. The preset guidance information set may be pre-stored locally, or acquired from an electronic device (e.g., the server 105 in FIG. 1) in communication connection therewith. As an example, the executing body may search, according to a preset corresponding relationship, the guidance information matching the user's behavior in the guidance information set, thereby determining the first guidance information.

In some optional implementations of the present embodiment, the executing body may also acquire object information of a behavior object, where behavior object is directed at by the user's behavior. The behavior object being directed at by the user's behavior may correspond to the user's behavior. As an example, the user's behavior may include, but is not limited to, at least one of the following: continuously switching episodes more than 3 times on a episodes detail page, switching up, down, left or right on a star detail page to select star information, pressing a return key on a play interface, or switching pages on a video search interface more than 3 times. Correspondingly, the behavior object being directed at by the user's behavior may be, successively: the episodes detail page, the star detail page, the play interface, or the video search interface. Furthermore, the information of a behavior object may include the content displayed on the above page.

In some optional implementations of the present embodiment, in response to that the user's behavior is preset repetitive behavior being detected, the executing body may further search the first guidance information matching the user's behavior in the preset guidance information set according to the following steps.

Step 1: determining a user's operation intention based on the user's behavior.

In these implementations, the executing body may determine the operation intention corresponding to the user's behavior according to a preset corresponding relationship table. The corresponding relationship table may be used to characterize corresponding relationships between user's behaviors and user's operation intentions. As an example, the user's behavior may indicate that the user operates the key of "fast forward" or "fast reverse" more than 3 times or for more than 3 seconds. According to the corresponding relationship table, the executing body may determine that the operation intention corresponding to the user's behavior is to fast forward or fast reverse to a desired time point. As another example, the user's behavior may indicate that the user presses a volume adjustment key more than 3 times or for more than 3 seconds. According to the corresponding relationship table, the executing body may determine that the operation intention corresponding to the user's behavior is to switch to an appropriate volume value.

Optionally, the executing body may further determine a user's operation intention based on the user's behavior and the object information of a behavior object being directed at by the user's behavior.

In these implementations, the user's behavior and the object information of the behavior object being directed at by the user's behavior may include, but are not limited to, at least one of the following: consecutively switching episodes more than 3 times on a episodes detail page, switching up, down, left or right on a star detail page to select star information, pressing a return key on a play interface, or switching pages on a video search interface more than 3 times. Correspondingly, the executing body may determine, according to the preset corresponding relationship, the user's operation intention may be correspondingly: switching to desired episode, searching encyclopedia details of a star, quitting playing, or finding a favorite program.

Step 2: searching, based on the operation intention corresponding to each piece of guidance information in the preset guidance information set, the first guidance information matching the user's operation intention.

In these implementations, the executing body may select the guidance information matching the user's operation intention determined in Step 1 from the preset guidance information set by using various methods as the first guidance information. As an example, the user's operation intention may be too fast forward or fast reverse to a desired time point, and the executing body may determine, according to the corresponding relationship between the guidance information in the preset guidance information set and the user's operation intention, that the matching guidance information is "You can say to me: 'Little D Little D, fast forward to 10 minutes'" or "You can say to me: 'Little D Little D, reverse to 3 minutes'". As another example, the user's operation intention may be to switch to an appropriate volume value, and the executing body may determine a volume range commonly used by the user based on historical data. The volume interval may include, but is not limited to, at least one of the following: a medium volume range corresponding to a volume value of the longest playback time for the user, a low volume range commonly used by the user in the evening, and a high volume interval commonly used by the user in the morning or during the day. The executing body may determine, according to the determined volume ranges commonly used, that the matching guidance information is "fast volume adjustment, you can say 'Little D Little D, adjust the volume to 30', 'Little D Little D, louder', 'Little D Little D, moderate volume'".

Optionally, the executing body may determine in the preset guidance information set, according to the user's operation intention determined in Step 1, the first guidance information matching the determined user's operation intention. As an example, the first guidance information may include "Tip: Which episode you want to watch, speech will be faster. 'Little D Little D, I want to see episode 8'", "Tip: Want to know more about the star? speech will be faster. 'Little D Little D, Andy Lau's Encyclopedia'", "Tip: Don't want to watch? speech will be faster. 'Little D Little D, quit playing'", "Tip: Which drama you want to watch, speech will be faster. 'Little D Little D, I want to see Andy Lau's ancient costume movie'".

In some optional implementations of the present embodiment, in response to that the object information of the behavior object being directed at by the user's behavior satisfies a preset guidance trigger condition being detected, the executing body may further search second guidance information matching the object information in the preset guidance information set. In these implementations, respective guidance information in the preset guidance information set may correspond to respective guidance trigger condition. The executing body may search, according to the detected user's behavior, a guidance trigger condition matching the user's behavior, and then determine the guidance information corresponding to the searched guidance trigger condition as the second guidance information.

As an example, the user's behavior may also characterize that the user sets an alarm for next day, triggers a transition page, presses a "play/pause" key, or the like. The transition page may include, but is not limited to, at least one of the following: a login interface displayed after booting, and a waiting page during upgrade. The object information of the behavior object being directed at by the user's behavior may include, but is not limited to, at least one of the following: a set alarm of next day, a content displayed by the login interface after booting, a content displayed by the waiting page during upgrade, an Internet speed during an audio or video file being played on line, whether the audio or video file is in a playing state, whether the video file is played to the opening or ending, whether an advertisement is about to be played during the playback of the video file, and whether the video file is played to a time point of a preset knowledge point. The preset guidance trigger condition may include, but is not limited to, at least one of the following: the alarm is set for next day, a large blank is maintained in the login interface (for example, 40% of the page space is not occupied), the estimated time for upgrade exceeds a preset time threshold, the Internet speed during the audio or video file being played on line is greater than a preset super-definition Internet speed threshold or smaller than a preset high-definition Internet speed threshold, the playback of the audio or video file is paused, the video file is played to the opening or ending, an advertisement is about to be played during the playback of the video file, or the video file is played to a time point of questioning a preset knowledge (for example, inserted questions and answers of geographic knowledge about the shooting location of a movie during playback of the movie).

In these implementations, the executing body may search, according to the preset corresponding relationship, the guidance information matching the object information in the preset guidance information set as the second guidance information. As an example, the executing body may determine the second guidance information based on the object information satisfying the preset guidance trigger condition. The second guidance information may include, but is not limited to, at least one of the following: "You can say 'Little D Little D, set an alarm at 7 o'clock tomorrow morning'", "Try to throw away the remote control and use voice to interact", "This upgrade optimizes the short video experience. After the upgrade is completed, you can say to me 'Little D Little D, I want to watch popular short videos'", "The current network speed is sufficient to higher-definition videos, you can say 'Little D Little D, switch to 4K' to switch the definition", "Tip: the current network video is loaded slow, suggest to switch to [fluent mode], say to me 'Little D Little D, immediately switch'", "Tip: 'Little D Little D, continue to play'", "Tip: 'Little D Little D, skip the opening'", "Tip: 'Little D Little D, play next episode'", "Tip: 'Little D Little D, skip the advertisement'", or "Tip: Want to know the answer? Say to me 'Little D Little D, what is the area of Xinjiang'".

Optionally, after finding "You can say 'Little D Little D, set an alarm at 7 o'clock tomorrow morning'", the executing body may further acquire the weather information of next day through a wired or wireless connection. Then, the executing body may also output the weather information. In addition, the executing body may continue to determine, through a preset guidance relationship, the information guiding the user to query the dressing index in the preset guidance information set as third guidance information and output the third guidance information.

Step 202: outputting the first guidance information.

In the present embodiment, the executing body may output the first guidance information searched in Step 201. The first information can be output in various manners, such as text, image, speech or the like. As an example, the executing body may perform speech synthesis on the first guidance information by using a speech synthesis technology. Then, the executing body may play an audio synthesized based on the first guidance information.

In some optional implementations of the present embodiment, the executing body may also output the first guidance information according to the following steps:

Step 1: determining, based on the first guidance information, a category of the first guidance information.

In these implementations, the executing body may determine, based on the first guidance information, a category of the first guidance information. The category may include a guidance category and a task category. The guidance category may include a category of guidance information triggered by a behavior indicated by the user's behavior. As an example, the behavior triggering the guidance information may include that the user operates a cursor to move on a display device, and may also include that the user operates a focus to move. The task category may include a category of guidance information triggered by the object information of the behavior object for the user's behavior. As an example, the object information triggering the guidance information may include an Internet speed during an audio or video file being played on line.

Step 2: in response to determining that the first guidance information belongs to a guidance category, determining a presentation mode of the first guidance information displayed in the form of a bubble.

In these implementations, in response to determining that the first guidance information belongs to the guidance category, the executing body may determine the presentation mode of the first guidance information displayed in the form of a bubble. The bubble refer to a form of information presentation that can be used to guide the user in the UI (User Interface) field. The presentation mode may include, but is not limited to, at least one of the following: appearing with a focus, gradually appearing from a preset position (for example, the upper right corner) in the interface.

Step 3: in response to determining that the first guidance information belongs to a task category, determining a task subcategory of the first guidance information.

In these implementations, in response to determining that the first guidance information belongs to the task category, the executing body may determine the task subcategory of the first guidance information. The task subcategory may include a novice task category and a speech task category. The novice task may include a task that is presented only during first boosting but will not presented after completion. The speech task may include, but is not limited to, at least one of the following: a task preset locally, a task acquired from a server in communication connection, and a task pushed to the executing body by the server in communication connection therewith according to a preset configuration (for example, pushed according to the dimension of time interval, day, period or the like). Thereafter, according to the determined task subcategory, the executing body may also determine a presentation time of the output guidance information displayed in the form of a bubble.

Step 4: determining a position of the first guidance information displayed in the form of a bubble in a display interface.

In these implementations, the executing body may also determine the position of the first guidance information displayed in the form of a bubble in the display interface. The position may be preset. For example, the position may characterize the bottom of a page. Or the position may be dynamically determined according to the space occupied by the content included in the guidance information and the blank area of the display page. Optionally, the preset position may be the lower right corner of the page. When a volume icon is displayed at the lower right corner of the page, the volume icon may be temporarily hidden when the first guidance information is displayed.

Step 5: presenting the first guidance information according to the determined position, presentation mode or presentation time.

In these implementations, the executing body may present the first guidance information on a display screen according to the position, the presentation mode or presentation time determined in Step 2 and Step 4.

Figure 3:
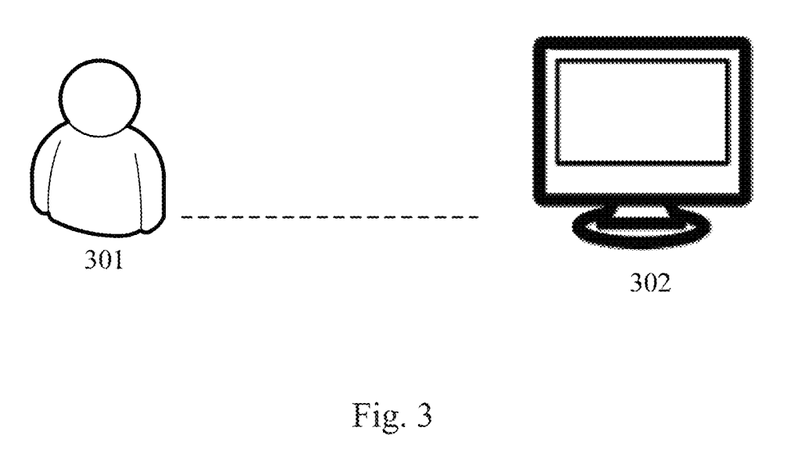
FIG. 3 is a flowchart of an application scenario of the method for outputting information according to an embodiment of the present disclosure.

Further refer to FIG. 3, which is a schematic diagram of an application scenario of the method for outputting information according to some embodiments of the present disclosure. In the application scenario of FIG. 3, a user 301 turns on a smart TV 302 at 20:45. The smart TV 302 detects that the user 301 played TV drama XXX on line at 21:00 every day for the past 5 days. Then, at 20:58, the smart TV 302 may display on the current playback interface prompt information "Time for drama is coming soon. Episode 3 of XXX was played yesterday. If you wish to continue watching, just say to me "Little D Little D, I want to continue watching'". Optionally, the prompt information may also be output in the form of audio through a speaker of the smart TV 302.

At present, one of the existing technologies usually displays speech guidance information at first boosting or when the user actively selects "Help", which cause that speech guidance information cannot be timely and effectively output according to user's behaviors, and unnecessary information output cost increases. According to the method provided by the above embodiments of the present disclosure, in response to that a user's behavior is a preset repetitive behavior being detected, first guidance information matching the user's behavior is searched in a preset guidance information set, and the matching guidance information is output. Timely guidance is achieved according to the repetitive interaction behavior between a user and an executing body, so that the user's repetitive behavior can be replaced by speech interaction. Therefore, on the one hand, the consumption of energy and the waste of network resources caused by aimless push or display of the guidance information are reduced; and on the other hand, by timely displaying the guidance information, the user is guided more effectively to reduce the repetitive operation behavior by speech interaction, and the wear of physical keys is reduced.

Figure 4:
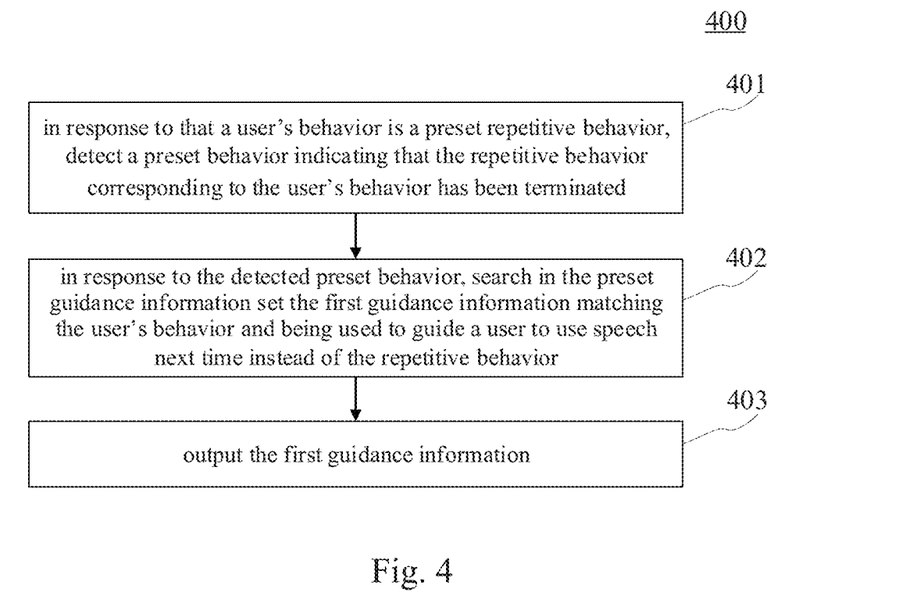
FIG. 4 is a flowchart of the method for outputting information according to another embodiment of the present disclosure.

Further referring to FIG. 4, a flow 400 of a method for outputting information according to another embodiment is shown. The flow 400 of the method for outputting information includes the following steps.

Step 401: detecting, in response to that user's behavior is preset repetitive behavior being detected, a preset behavior indicating that a repetitive behavior corresponding to the user's behavior has been terminated.

In the present embodiment, in response to that the user's behavior is preset repetitive behavior being detected, an executing body (for example, the terminal device 101, 102 or 103 shown in FIG. 1) of the method for outputting information may detect a preset behavior indicating that the repetitive behavior corresponding to the user's behavior has been terminated. The preset behavior indicating that the repetitive behavior corresponding to the user's behavior has been terminated may be used to indicate an operation that is performed within a preset time interval after the repetitive behavior and indicates that the repetitive behavior has been completed. As an example, the operation indicated by the preset behavior that the repetitive behavior corresponding to the user's behavior has been terminated may include, but is not limited to, at least one of the following: clicking the key representing "confirm to enter into the column" after selecting a certain column through a shift key at the home page after booting, entering a playback interface of a long video after switching more than three times, and clicking the "OK" key after switching the definition or Dolby sound effect by a series of operations (for example, selecting "Settings"-"Playback Options"-"Definition"-"4K", "Settings"-"Playback Options"-"Sound Effect"-"Dolby Sound Effect").

It should be noted that the method for detecting a user's behavior may be consistent with the method described in step 201 of the foregoing embodiments, and details are not described herein again.

Step 402: in response to the detected preset behavior, searching in a preset guidance information set the first guidance information matching the user's behavior and being used to guide a user to use speech next time instead of the repetitive behavior.

In the present embodiment, in response to the detected preset behavior, the executing body may search in the preset guidance information set the first guidance information that matching the user's behavior and being used to guide the user to use speech next time instead of the repetitive behavior. The executing body may search the first guidance information through a method similar to step 201 in the foregoing embodiments. As an example, for the preset behavior exemplified in step 401, the first guidance information searched by the executing body may include, but is not limited to, at least one of the following: "Next time you can say "Little D Little D, open the application', 'Little D Little D, open settings'", "Next time you can say 'Little D Little D, play episode 8 of XX', 'Little D Little D, play a good show'", "Next time you can say 'Little D Little D, switch to 4K resolution', or 'Little D Little D, switch to Dolby sound effect'".

In some optional implementations of the present embodiment, in response to that the user's behavior is preset repetitive behavior and the preset behavior is not detected being detected, first guidance information matching the user's behavior and being used to guide the user to use speech currently instead of the repetitive behavior is searched in the preset guidance information set. In these implementations, as an example, the user's behavior may include consecutively pressing a key representing brightness increase more than 3 times on the page for adjusting the brightness, and the first guidance information searched by the executing body may include "You can say 'Little D Little D, increase brightness by 5'".

Step 403: outputting the first guidance information.

Step 403 is consistent with step 202 in the foregoing embodiments, the description for step 202 also applies to step 403, and details are not described herein again.

It can be seen from FIG. 4 that, compared with the corresponding embodiments of FIG. 2, the flow 400 of the method for outputting information in the present embodiment embodies the step of detecting whether the repetitive behavior indicating the user's behavior has been terminated. Thus, the solution described in the present embodiment can prompt the user to interact with speech next time instead of a repetitive operation according to the current user's operation. Therefore, the information which guides the user to interact with speech instead of a repetitive behavior is timely pushed, the conversion rate of the pushed information is improved, and the resource consumption caused by aimless pushing is reduced accordingly.

Figure 5:
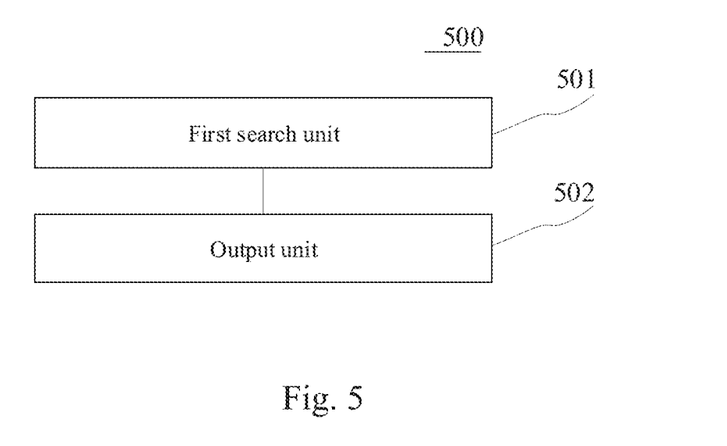
FIG. 5 is a schematic structural diagram of an apparatus for outputting information according to an embodiment of the present disclosure.

Further referring to FIG. 5, as an implementation of the method shown in the above figures, the present disclosure provides an embodiment of an apparatus for outputting information. The embodiments of the apparatus corresponds to the embodiments of the method shown in FIG. 2, and the apparatus may be applied to various electronic devices.

As shown in FIG. 5, the apparatus 500 for outputting information according to the present embodiment includes a first search unit 501 and an output unit 502. The first search unit 501 is configured to search, in response to that a user's behavior is a preset repetitive behavior being detected, first guidance information matching the user's behavior in a preset guidance information set, where guidance information is used to guide a user to use speech instead of the preset repetitive behavior; and the output unit 502 is configured to output the first guidance information.

In the present embodiment, in the apparatus 500 for outputting information, for specific processes of the first search unit 501 and the output unit 502 and technical effects achieved, reference may be made to related descriptions of step 201 and step 202 in the corresponding embodiment of FIG. 2, and details are not described herein again.

In some optional implementations of the present embodiment, the apparatus 500 for outputting information may further include: an acquisition unit (not shown), configured to acquire object information of a behavior object being directed at by the user's behavior.

In some optional implementations of the present embodiment, the first search unit 501 may include a first determination module (not shown) and a first search module (not shown). The first determination module may be configured to determine, in response to that the user's behavior is the preset repetitive behavior being detected, a user's operation intention based on the user's behavior. The first search module may be configured to search, based on operation intention corresponding to each piece of guidance information in the preset guidance information set, the first guidance information matching the user's operation intention.

In some optional implementations of the present embodiment, the first search module may be further configured to determine, in response to that the user's behavior is preset repetitive behavior being detected, the user's operation intention based on the user's behavior and the object information of the behavior object being directed at by the user's behavior.

In some optional implementations of the present embodiment, the apparatus 500 for outputting information may further include: a second search unit (not shown) configured to search, in response to that the object information of the behavior object being directed at by the user's behavior satisfies a preset guidance trigger condition being detected, second guidance information matching the object information in the preset guidance information set.

In some optional implementations of the present embodiment, the first search unit 501 may include a detection module (not shown) and a second search module (not shown). The detection module may be configured to detect, in response to that the user's behavior is the preset repetitive behavior being detected, preset behavior indicating that a repetitive behavior corresponding to the user's behavior has been terminated. The second search module may be configured to search in the preset guidance information set, in response to the detected preset behavior, first guidance information matching the user's behavior and being used to guide the user to use speech next time instead of the repetitive behavior.

In some optional implementations of the present embodiment, the first search unit 501 may further include: a third search module (not shown) configured to search in the preset guidance information set, in response to that the user's behavior is the preset repetitive behavior being detected and the preset behavior being not detected, first guidance information matching the user's behavior and being used to guide the user to use speech currently instead of the repetitive behavior.

In some optional implementations of the present embodiment, the output unit 502 may include: a category determination module (not shown), a presentation mode determination module (not shown), a subcategory determination module (not shown), a position determination module (not shown), and a presentation module (not shown). The category determination module may be configured to determine, based on the first guidance information, a category of the first guidance information, where the category may include a guidance category and a task category. The presentation mode determination module may be configured to determine, in response to determining that the first guidance information belongs to the guidance category, a presentation mode of the first guidance information displayed in the form of a bubble, where the presentation mode may include at least one of: appearing with a focus, or appearing from a preset position. The subcategory determination module may be configured to determine, in response to determining that the first guidance information belongs to the task category, a task subcategory of the first guidance information, where the task subcategory may include a novice task category and a speech task category; and to determine, according to the determined task subcategory, a presentation time of the first guidance information displayed in the form of a bubble. The position determination module may be configured to determine a position of the first guidance information displayed in the form of a bubble in a display interface. The presentation module may be configured to present the first guidance information according to the determined position, presentation time, presentation mode or presentation time.

According to the apparatus provided by the above embodiments of the present disclosure, in response to that a user's behavior is a preset repetitive behavior being detected, a first search unit 501 searches first guidance information matching the user's behavior in a preset guidance information set, where the guidance information is used to guide a user to use speech instead of the preset repetitive behavior; and then the output unit outputs the first guidance information. Timely guidance is achieved based on the repetitive interaction behavior between the user and an executing body, so that the user's repetitive behavior is replaced by speech interaction.

Hereinafter, referring to FIG. 6, a schematic structural diagram of an electronic device (e.g., the terminal device 101, 102 or 103 in FIG. 1) 600 adapted to implement the embodiments of the present disclosure is shown. The terminal device in the embodiments of the present disclosure may include, but is not limited to, mobile terminals such as a mobile phone, a notebook computer, a digital broadcast receiver, a PDA (Personal Digital Assistant), a PAD (Tablet Computer), a PMP (Portable Multimedia Player), or a vehicle terminal (e.g., a vehicle navigation terminal), and fixed terminals such as a digital TV or a desktop computer. The terminal device shown in FIG. 6 is merely an example, and should not limit the function and scope of use of the embodiments of the present disclosure.

Figure 6:
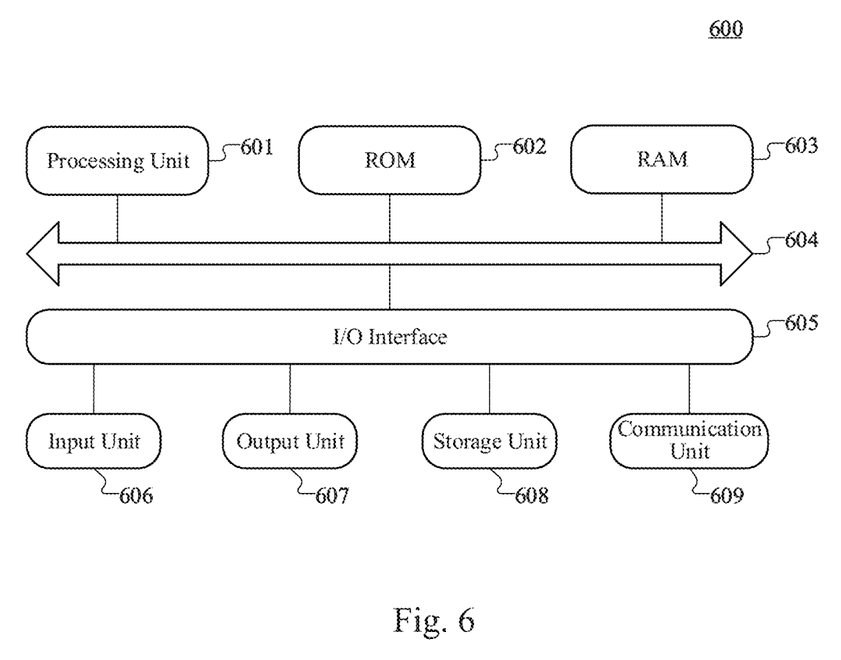
FIG. 6 is a schematic structural diagram of an electronic device adapted to implement some embodiments of the present disclosure.

As shown in FIG. 6, the electronic device 600 may include a processing apparatus (e.g., a central processing unit, a Graphics Processing Unit, etc.) 601, which may execute various appropriate operations and processes according to a program stored in a read-only memory (ROM) 602 or a program loaded into a random access memory (RAM) 603 from a storage apparatus 608. The RAM 603 also stores various programs and data required by operations of the electronic device 600. The processing apparatus 601, the ROM 602, and the RAM 603 are connected to each other through a bus 604. An input/output (I/O) interface 605 is also connected to the bus 604.

Generally, the following units may be connected to the I/O interface 605: an input unit 606, including, for example, a touch screen, a touch pad, a keyboard, a mouse, a camera, a microphone, an accelerometer, a gyroscope, etc.; an output unit 607, including, for example, a liquid crystal display (LCD), a speaker, a vibrator, etc.; a storage unit 608, including, for example, a storage card, etc.; and a communication unit 609. The communication unit 609 may allow wireless or wired communication between the electronic device 600 and other device to exchange data. Although FIG. 6 illustrates the electronic device 600 having various units, it should be understood that all the illustrated units are not required to be implemented or included. More or less units may be alternatively implemented or included. Each block shown in FIG. 6 may represent one unit or a plurality of units as required.

In particular, according to the embodiments of the present disclosure, the process described above with reference to the flowchart may be implemented in a computer software program. For example, an embodiment of the present disclosure includes a computer program product including a computer program loaded to a computer readable medium, the computer program including a program code for executing the method shown in the flowchart. In such an embodiment, the computer program may be downloaded and installed from a network via the communication unit 609, or installed from the storage unit 608, or installed from the ROM 602. The computer program, when executed by the processing unit 601, implements the above functions defined in the method of the embodiments of the present disclosure.

It should be noted that the computer readable medium of the embodiments of the present disclosure may be a computer readable signal medium or a computer readable storage medium or a combination of the two. An example of the computer readable storage medium may be, but is not limited to: electric, magnetic, optical, electromagnetic, infrared, or semiconductor systems, apparatuses, elements, or any combination of the above. A more specific example of the computer readable storage medium may include but is not limited to: an electrical connection with one or more wires, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory, or any suitable combination of the above. In the embodiments of the present disclosure, the computer readable storage medium may be any tangible medium containing or storing programs which may be used by an instruction execution system, apparatus or device or incorporated thereto. In the embodiments of the present disclosure, the computer readable signal medium may include data signals in base bands or propagated as part of carriers, in which computer readable program codes are carried. The propagated data signals may be in various forms, including but not limited to: electromagnetic signals, optical signals or any suitable combination of the above. The computer readable signal medium may also be any computer readable medium except the computer readable storage medium. The computer readable signal medium is capable of sending, propagating or transmitting a program used by an instruction execution system, apparatus or device or a combination of them. The program codes included in the computer readable medium may be transmitted by any appropriate medium, including but not limited to a wire, an optical cable, RF (Radio Frequency), etc., or any appropriate combination of them.

The computer readable medium may be included in the terminal device, or exists alone and is not assembled into the terminal device. The computer readable medium carries one or more programs, and when the one or more programs are executed by the terminal device, the terminal device is caused to: searching, in response to that a user's behavior is a preset repetitive behavior being detected, first guidance information matching the user's behavior in a preset guidance information set, where guidance information is used to guide a user to use speech instead of the preset repetitive behavior; and outputting the first guidance information.

Computer program codes for executing operations in the embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program codes may be completely executed on a user's computer, partially executed on a user's computer, executed as a separate software package, partially executed on a user's computer and partially executed on a remote computer, or completely executed on a remote computer or a server. In the circumstance involving a remote computer, the remote computer may be connected to a user's computer through any network, including a local area network (LAN) or a wide area network (WAN), or connected to an external computer (for example, connected through Internet using an Internet service provider).

The flowcharts and block diagrams in the drawings illustrate system architectures, functions and operations that may be implemented according to the systems, methods and computer program products of various embodiments of the present disclosure. In this regard, each box in the flowcharts or block diagrams may represent a module, a program segment, or a part of a code, which includes one or more executable instructions for implementing the specified logical functions. It should be noted that, in some alternative implementations, the functions marked in the boxes may also be implemented in an order different from that marked in the drawing. For example, two consecutive boxes substantially may be executed in parallel, or sometimes executed in a reverse order, depending on the involved functions. It should also be noted that, each box in the block diagrams and/or flowcharts, and a combination of boxes in the block diagrams and/or flowcharts may be implemented by a dedicated hardware-based system for executing specified functions or operations, or implemented by a combination of dedicated hardware and computer instructions.

The units described in the embodiments of the present disclosure may be implemented by software or hardware. The units described may also be set in a processor, for example, described as a processor includes a first search unit and an output unit. The names of these units do not constitute limitations to the units themselves in some cases. For example, the first search unit may also be described as "a unit for searching, in response to that a user's behavior is a preset repetitive behavior being detected, first guidance information matching the user's behavior in a preset guidance information set, where guidance information is used to guide a user to use speech instead of the preset repetitive behavior".

The above description only provides an explanation of the preferred embodiments of the present disclosure and the technical principles used. It should be appreciated by those skilled in the art that the inventive scope of the embodiments of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical solutions formed by the above-described features being interchanged with (but not limited to) technical features with similar functions disclosed in the embodiments of the present disclosure are examples.

What is claimed is:

1. A method for outputting information, comprising:
    searching, in response to determining that a user's behavior is a preset repetitive behavior being detected, a first guidance information matching the user's behavior in a preset guidance information set, wherein guidance information is used to guide a user to use speech instead of the preset repetitive behavior; and
    outputting the first guidance information.

2. The method according to claim 1, wherein the method further comprises:
    acquiring object information of a behavior object being directed at by the user's behavior.

3. The method according to claim 2, wherein the searching, in response to determining that the user's behavior is the preset repetitive behavior being detected, the first guidance information matching the user's behavior in the preset guidance information set comprises:

determining, in response to that the user's behavior is the preset repetitive behavior being detected, a user's operation intention based on the user's behavior; and     searching, based on operation intention corresponding to each piece of guidance information in the preset guidance information set, the first guidance information matching the user's operation intention.

4. The method according to claim 3, wherein the determining, in response to determining that the user's behavior is the preset repetitive behavior being detected, the user's operation intention based on the user's behavior comprises:

determining, in response to that the user's behavior is the preset repetitive behavior being detected, the user's operation intention based on the user's behavior and the object information of the behavior object being directed at by the user's behavior.

5. The method according to claim 2, wherein the method further comprises:

in response to that the object information of the behavior object being directed at by the user's behavior satisfies a preset guidance trigger condition being detected, searching a second guidance information matching the object information in the preset guidance information set.

6. The method according to claim 1, wherein the searching, in response to determining that the user's behavior is the preset repetitive behavior being detected, the first guidance information matching the user's behavior in the preset guidance information set comprises:

in response to that the user's behavior is the preset repetitive behavior being detected, detecting a preset behavior indicating that a repetitive behavior corresponding to the user's behavior has been terminated; and     in response to detecting the preset behavior, searching in the preset guidance information set the first guidance information matching the user's behavior and being used to guide the user to use speech next time instead of the repetitive behavior.

7. The method according to claim 6, wherein the searching, in response to determining that the user's behavior is the preset repetitive behavior being detected, the first guidance information matching the user's behavior in the preset guidance information set further comprises:

in response to that the user's behavior is the preset repetitive behavior being detected and the preset behavior being not detected, searching in the preset guidance information set the first guidance information matching the user's behavior and being used to guide the user to use speech currently instead of the repetitive behavior.

8. The method according to claim 1, wherein the outputting the first guidance information comprises:

determining, based on the first guidance information, a category of the first guidance information, wherein the category comprises a guidance category and a task category;

in response to determining that the first guidance information belongs to the guidance category, determining a presentation mode of the first guidance information displayed in a form of a bubble, wherein the presentation mode comprises at least one of: appearing with a focus, or appearing from a preset position;

in response to determining that the first guidance information belongs to the task category, determining a task subcategory of the first guidance information, wherein the task subcategory comprises a novice task category and a speech task category;

determining, according to the determined task subcategory, a presentation time of the first guidance information displayed in the form of a bubble;

determining a position of the first guidance information displayed in the form of a bubble in a display interface; and     presenting the first guidance information according to the determined position, the presentation mode, or the presentation time.

9. An apparatus for outputting information, comprising:

at least one processor; and a memory storing instructions, the instructions when executed by the at least one processor, cause the at least one processor to perform operations, the operations comprising:

searching, in response to determining that a user's behavior is a preset repetitive behavior being detected, first guidance information matching the user's behavior in a preset guidance information set, wherein guidance information is used to guide a user to use speech instead of the preset repetitive behavior; and     outputting the first guidance information.

10. The apparatus according to claim 9, wherein the operations further comprise:

acquiring object information of a behavior object being directed at by the user's behavior.

11. The apparatus according to claim 10, wherein the searching, in response to determining that the user's behavior is the preset repetitive behavior being detected, the first guidance information matching the user's behavior in the preset guidance information set comprises:

determining, in response to that the user's behavior is the preset repetitive behavior being detected, a user's operation intention based on the user's behavior; and     searching, based on operation intention corresponding to each piece of guidance information in the preset guidance information set, the first guidance information matching the user's operation intention.

12. The apparatus according to claim 11, wherein the determining, in response to determining that the user's behavior is the preset repetitive behavior being detected, the user's operation intention based on the user's behavior comprises:

determining, in response to that the user's behavior is the preset repetitive behavior being detected, the user's operation intention based on the user's behavior and the object information of the behavior object being directed at by the user's behavior.

13. The apparatus according to claim 10, wherein the operations further comprise:

searching, in response to that the object information of the behavior object being directed at by the user's behavior satisfies a preset guidance trigger condition being detected, a second guidance information matching the object information in the preset guidance information set.

14. The apparatus according to claim 9, wherein the searching, in response to determining that the user's behavior is the preset repetitive behavior being detected, the first guidance information matching the user's behavior in the preset guidance information set comprises:

detecting, in response to that the user's behavior is the preset repetitive behavior being detected, a preset behavior indicating that the preset repetitive behavior corresponding to the user's behavior has been terminated; and searching in the preset guidance information set, in response to detecting the preset behavior, the first guidance information matching the user's behavior and being used to guide the user to use speech next time instead of the preset repetitive behavior.

15. The apparatus according to claim 14, wherein the searching, in response to determining that the user's behavior is the preset repetitive behavior being detected, the first guidance information matching the user's behavior in the preset guidance information set further comprises:

searching in the preset guidance information set, in response to that the user's behavior is the preset repetitive behavior being detected and the preset behavior being not detected, the first guidance information matching the user's behavior and being used to guide the user to use speech currently instead of the preset repetitive behavior.

16. The apparatus according to claim 9, wherein the outputting the first guidance information comprises:

determining, based on the first guidance information, a category of the first guidance information, wherein the category comprises a guidance category and a task category;

determining, in response to determining that the first guidance information belongs to the guidance category, a presentation mode of the first guidance information displayed in a form of a bubble, wherein the presentation mode comprises at least one of: appearing with a focus, or appearing from a preset position;

determining, in response to determining that the first guidance information belongs to the task category, a task subcategory of the first guidance information, wherein the task subcategory comprises a novice task category and a speech task category;

determining, according to the determined task subcategory, a presentation time of the first guidance information displayed in the form of a bubble;

determining a position of the first guidance information displayed in the form of a bubble in a display interface; and presenting the first guidance information according to the determined position, the presentation mode, or the presentation time.

17. A non-transitory computer readable medium storing a computer program, wherein the computer program, when executed by a processor, cause the processor to perform operations, the operations comprising:

searching, in response to determining that a user's behavior is a preset repetitive behavior being detected, first guidance information matching the user's behavior in a preset guidance information set, wherein guidance information is used to guide a user to use speech instead of the preset repetitive behavior; and outputting the first guidance information.

18. The non-transitory computer readable medium according to claim 17, wherein the operations further comprises:

acquiring object information of a behavior object being directed at by the user's behavior.

19. The non-transitory computer readable medium according to claim 18, wherein the searching, in response to determining that the user's behavior is the preset repetitive behavior being detected, the first guidance information matching the user's behavior in the preset guidance information set comprises:

determining, in response to that the user's behavior is the preset repetitive behavior being detected, a user's operation intention based on the user's behavior; and searching, based on operation intention corresponding to each piece of guidance information in the preset guidance information set, the first guidance information matching the user's operation intention.

20. The non-transitory computer readable medium according to claim 19, wherein the determining, in response to determining that the user's behavior is the preset repetitive behavior being detected, the user's operation intention based on the user's behavior comprises:

determining, in response to that the user's behavior is the preset repetitive behavior being detected, the user's operation intention based on the user's behavior and the object information of the behavior object being directed at by the user's behavior.

* * * * *